L. J. WOODRUFF.
Improvement in Snow-Plows and Rail-Cleaners.
No. 114,633 — Patented May 9, 1871.

L. J. Woodruff, Inventor.

James Lewis.
H. D. Alexander.
} Witnesses.

UNITED STATES PATENT OFFICE.

LUTHER J. WOODRUFF, OF MOHAWK, NEW YORK, ASSIGNOR OF ONE-HALF HIS RIGHT TO FRANCIS S. WILCOX.

IMPROVEMENT IN SNOW-PLOWS AND RAIL-CLEANERS.

Specification forming part of Letters Patent No. 114,633, dated May 9, 1871.

*To all whom it may concern:*

Be it known that I, LUTHER J. WOODRUFF, of Mohawk, in the town of German Flats, county of Herkimer, and State of New York, have invented a new and useful Improvement in Snow-Plows and Rail-Cleaners for Cars on Street-Railroads; and I do hereby declare that the following is a full, clear, and exact description of the construction and operation of the same, reference being had to the annexed drawing, making a part of this specification, in which—

Figure 1:
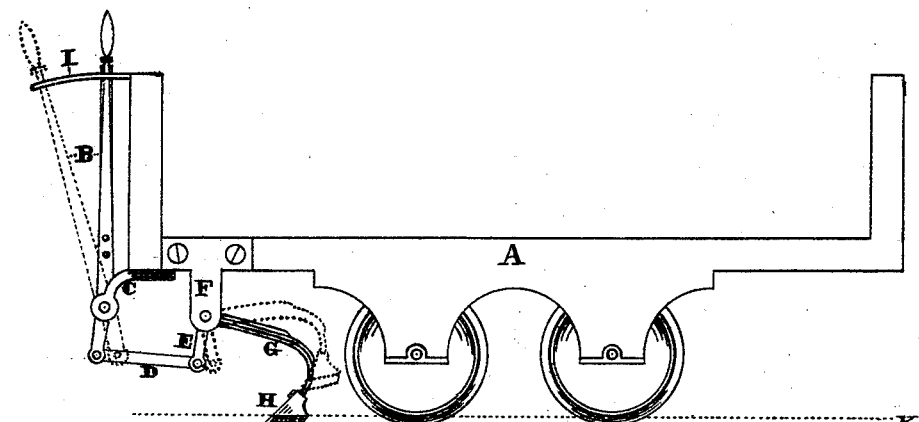
Figure 2:
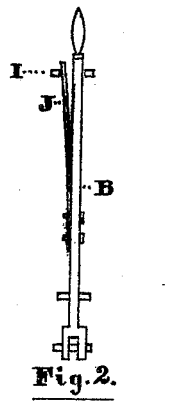
Figure 3:
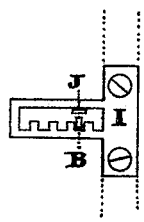
Figure 4:

Figure 1 represents a side elevation of the truck of a car (such as may be in use on street-railroads) with this improvement added. Fig. 2 represents the lever B, shown in Fig. 1, as seen divested of its connections, and as seen from the left-hand end or front of Fig. 1. Fig. 3 represents the part I of Fig. 1 as seen from above. Fig. 4 represents the part H of Fig. 1 as resting upon the top of the rail K.

In the several figures identical letters refer to identical parts.

The several parts which illustrate the invention now under consideration are as follows:

A rock-shaft is supported at its two ends by two similar parts, F, Fig. 1, only one of which is shown in the drawing—one on each side of the truck A. To the rock-shaft are attached two similar sets of steel springs, G, one of which set of springs only is shown in the drawing, a set of which springs G is adjusted over each rail and in front of the wheels on which the truck runs.

At the extremities of the two sets of springs G most remote from the rock-shaft to which they are attached, and immediately over each rail on which the truck runs, is secured to each set of springs G a steel plow, H, of suitable form and size to remove any movable body or soft snow, ice, mud, dirt, or gravel from the surfaces of the rails on which the wheels run, or with which the flanges come in contact when the truck is in motion.

Conveniently near the center of the length of the rock-shaft is attached a short lever, E, by means of which the rock-shaft is caused partially to rotate, raising the springs G and plow H from the rail K, or pressing them down so as to bring the plow H near to or in contact with the rail, as may be desired.

The part D in Fig. 1 serves as a connecting-rod, by means of which the short lever E on the rock-shaft is connected with the hand-lever B, which hand-lever B is supported by means of the part C, suitably secured to the truck A.

The hand-lever B extends upward through the part I, so as to be in reach of a person standing upon the truck A.

It will be seen by reference to the dotted outlines in the drawing, Fig. 1, that when the hand-lever B is pushed away from the person standing on the truck A the plow H is raised from the rail K, and when the hand-lever B is drawn back to the position in which it is figured in the drawing, Fig. 1, the plow H is caused to approach the rail and rest upon it.

The part I, Figs. 1, 2, and 3, serves to hold the hand-lever B in any position desired, so as to govern the position of the plow H with reference to the rail K, and the mode in which this is accomplished will be understood by reference to Figs. 2 and 3, in which the relative forms and positions of the several parts are indicated.

In Fig. 2 is delineated a spring, J, attached to the hand-lever B by rivets or screws, or in any convenient manner. The spring J serves to hold the upper part of the hand-lever B in notches cut in one side of a slot in the part I.

In Figs. 2 and 3 the relative positions of the parts I, J, and B to each other are shown in a manner that renders further description of these parts unnecessary.

The notched slot in the part I, Fig. 3, is wide enough to permit the hand-lever B to be moved from one notch to another, as may be desired, simply by pressing the hand-lever B against the spring J to release the lever from the notch in which it rests.

The plow H should be made to conform to those surfaces of the rail K which it is desired should be acted upon. It should also be so made as to be readily detached from the curved springs G, so that when worn or broken it may be removed and a new one substituted.

The springs G are designed, by their elasticity, to prevent injury to the plows H in case the plows meet with any immovable obstruction, such as the head of a spike in the rail or the end of a rail where the junction of two rails is imperfect.

Operation.

When the parts in the drawing illustrating this invention are not required to be in use, the hand-lever B and the plows H are set in the position indicated by their dotted outlines.

When it is desired to bring the plows near to, but not in contact with, the rails, the hand-lever B is drawn toward the car a suitable distance, being held in the position given it by the part I and spring J. In this case the plows H will serve to remove from the rails stones, sticks, or other similar obstructions, and in some cases possibly prevent persons from being run over by the wheels of the car.

When a slight film of snow, soft ice, gravel, or dirt is to be removed, the plows H are set down so as to touch, but not to press heavily on, the rails. By drawing the hand-levers B snugly against the front of the car adherent obstructions may be removed from the rails.

The plows H will also be found to operate as a brake of much service when the rails are covered with a thin film of adherent ice, over which the wheels of the car would slide when held by the ordinary brake.

When used as a brake the plows H are to be firmly pressed upon the rails by means of the hand-lever B.

Claim.

I claim—

The combination of the scraper H, spring-arm G, rigidly attached to the rock-shaft, short lever E, connecting-rod D, lever B, spring J, and the slotted and notched arm I, when arranged in the manner and for the purpose set forth.

L. J. WOODRUFF.

Witnesses:
JAMES LEWIS,
H. D. ALEXANDER.